Nov. 28, 1961 B. T. RICHARDS 3,010,195

METHOD OF MANUFACTURING A WIRE MESH BODY

Original Filed Dec. 6, 1955

INVENTOR.
BRINLEY T. RICHARDS

BY Emery, Whittemore,
Sandoe & Graham
ATTORNEYS

United States Patent Office 3,010,195
Patented Nov. 28, 1961

3,010,195
METHOD OF MANUFACTURING A
WIRE MESH BODY
Brinley T. Richards, Short Hills, N.J., assignor to Titeflex, Inc., Newark, N.J., a corporation of Massachusetts
Original application Dec. 6, 1955, Ser. No. 551,406. Divided and this application Sept. 22, 1959, Ser. No. 845,588
2 Claims. (Cl. 29—419)

This invention relates to a method of manufacturing a resilient, form-retaining, wire mesh body adapted to serve as a liner for means for supporting conduit lines, for example the fuel lines, oil lines and electric lines of an airplane engine.

These conduit supporting means are commonly known as tube clamps, or clips, and generally include a resilient pad which provides a vibration reducing suport for the conduit. On aircraft engines, for example, it usually is desired to ground the conduits electrically to the engine or frame on which they are supported and when the resilient pad is non-metallic it is necessary to provide auxiliary grounding means, which sometimes is embodied right in the clamp structure. These auxiliary grounding means add to the cost of the clamp, sometimes make it more difficult to install the clamp properly on a conduit, and unless properly installed do not provide reliable grounding.

It is an object of the present invention to provide an improved method of manufacturing a wire mesh body to be used as a liner for a clamp which may be easily and quickly installed on a conduit without danger of the pad corners interfering with the installing of the clamp, or becoming folded back to form a double thickness between the clamp and the conduit. It also is an object of the invention to provide an improved method of manufacturing a wire mesh body for use as a liner for a tube clamp which furnishes an adequately resilient support and good electrical ground for the conduit, which is small in size, which is economical to manufacture, and which is suitable for use at high temperatures. It is a further object of the invention to provide an improved method of manufacturing a compressed, knitted wire fabric pad in which there are no wire ends exposed on the surface of the pad. It is still another object of the invention to provide a method of manufacturing a longitudinally split cylindrical metal fabric pad in which the opposed longitudinal edges of the split cylinder are formed with tabs for securing the pad in the clamp and taper back from the tabs to the ends of the cylinder. It also is an object of the invention to provide a method for manufacturing such a pad from a knitted tubular metal fabric. Other objects, advantages and improvements of the invention will become evident or will be pointed out as the description proceeds.

The present application is a division of my application for Tube Clamp and Method of Manufacture filed December 6, 1955, Serial No. 551,406, patented March 22, 1960, Patent No. 2,929,595.

A preferred embodiment of the invention selected for purposes of illustration and description is shown in the accompanying drawings, wherein.

The tube clamp to which the present invention relates comprises an openable metal loop adapted to surround a tube or similar article in spaced relation. In the illustrative embodiment of FIGURE 1 this loop is a flexible metal strap 11 bent to encompass a tube. The straight end portions 12 of the strap 11 are arranged to overlie each other when the loop is clamped about a tube and are provided with registering openings to receive a bolt or screw to secure the ends together and to secure the loop to a support.

Secured on the inner surface of the bent portion of the loop is a pad 13 for gripping a tube when the ends of the loop are brought together around the tube. This pad is generally in the form of a longitudinally split, form-retaining cylinder which can be spread open sufficiently to permit insertion of the tube. If the pad is made of consolidated metal fabric, as it desirably will be, it may be secured to the loop by spot welds centered lengthwise of the cylinder near its longitudinally split edges. If the pad is rectangular in shape the unsecured corners of the pad tend to splay, and when the clamp is positioned around a tube one or more of the corners may become folded under the rest of the pad and prevent a good uniform grip and contact on the tube.

Figure 1:
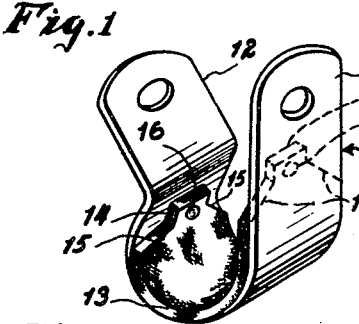
FIGURE 1 is a perspective view of a tube clamp embodying the present invention.
Figure 2:
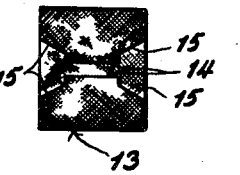
FIGURE 2 is a side elevation of a longitudinally split, cylindrical, metal fabric pad similar to that employed in the tube clamp of FIGURE 1.
Figure 3:
FIGURE 3 is an end elevation of the pad shown in FIGURE 2.

As may be clearly seen in FIGURES 1–3, in the present invention the opposed longitudinal edges of the split cylindrical pad 13 are formed with tabs 14 disposed intermediate the ends of the cylinder, by which the pad is secured to the loop 11, for example by spot welds. It has been found that provision of the tabs greatly reduces the tendency of the corners of the pad to splay and also reduces the likelihood of any part of the pad being folded under when the clamp is positioned on a tube. The construction is further improved by tapering the opposed edges of the cylinder back from the tabs to the ends of the cylinder, as shown at 15.

Ordinarily it will be sufficient, and generally preferable, to secure the pad to the loop only by spot welds at the tabs. These welds are indicated at 16, in FIGURE 1.

There are important advantages in making the pad 13 of metal. Metal is suitable for use at very high temperatures and metal eliminates the need for auxiliary electric grounding means. In order to provide the desired resiliency and gripping action the metal pad should have a spongy character, but still should be firm enough to be self-sustaining in form. There should be no sharp metal edges or wire ends, this being important from the standpoint of abrasion of the tube and the loop, as well as from the standpoint of convenience and safety in handling the pad and the clamp.

According to the present invention the pad 13 is a compressed metal fabric pad manufactured from a length of knitted metal wire tube in such a manner that no free wire end is exposed on the surface of the finished pad. The method of making the pad will now be described, reference being had particularly to FIGURES 4–8.

Figure 4:
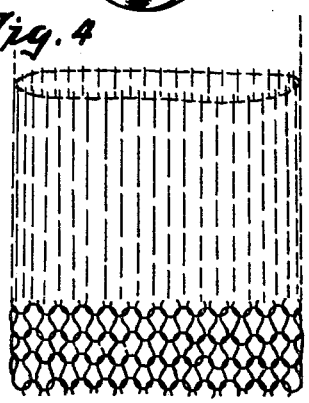
FIGURE 4 is an elevation, to enlarged scale, of a length of loosely knitted tubular wire fabric such as may be employed in the manufacture of the pad.

FIGURE 4 illustrates, somewhat diagrammatically, a loosely knitted tubular fabric that has been flattened. This tube may be knitted, for example from stainless steel wire, in long lengths, on conventional wire knitting machines, then flattened and cut to desired lengths. The knitting should be open or loose, so as to permit adjacent loops to slide on each other and telescope under the pressing operation to be described hereinafter. If compressed in the direction of the longitudinal axis of the tube, adjacent rows of loops will slide on each other, whereas compression on the transverse axis will cause adjacent loops within a row to slide on each other and be consolidated.

Figure 5:
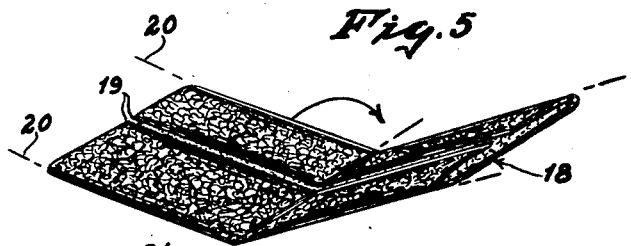
FIGURE 5 is a perspective view illustrating the procedure for folding a length of relatively large diameter tubular wire fabric in the production of the longitudinally split cylindrical pad.

If knitted tubing of a relatively large diameter is used it may be folded as shown in FIGURE 5 to insure that there will be no wire end exposed on the surface of the finished longitudinally split pad. The cut ends 19 of the flattened length 18 of knitted tube are folded together about transverse axes 20 of the flattened tube toward each other, so that their ends substantially meet, or are separated only by a short gap. Then the original longitudinal edges of the flattened tube are folded together about the longitudinal axis 21 of the tube. This produces a multi-layer unit of loosely knitted wire fabric in which all wire ends lie in the interior of the unit.

Figure 6:
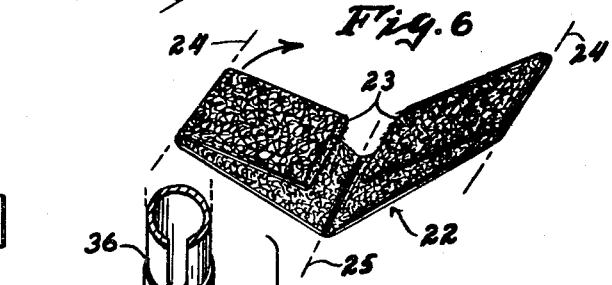
FIGURE 6 is a perspective view illustrating the method of folding a length of relatively small diameter tubular wire fabric in the production of the longitudinally split cylindrical pad.

In the event that a knitted tube of relatively small diameter is used it may be folded as shown in FIGURE 6. The cut ends 23 of the flattened length 22 of knitted tube are folded together about transverse axes 24 of the flattened tube located approximately ¼ of the length of the tube from its ends, so that the cut ends substantially meet, or are separated only by a short gap, at the longitudinal center of the tube. Then the thus folded ends of the tube are folded together about the central transverse axis 25 of the length of tube. This method of folding also produces a multi-layer unit of loosely knitted wire fabric in which all of the wire ends lie in the interior of the unit.

The knitted wire fabric unit produced by the folding operation of either FIGURE 5 or FIGURE 6 is a rectangular body. This unit is rolled into a longitudinally split cylindrical shape, and then compressed and consolidated by the apparatus shown in FIGURES 7 and 8 to produce a firmly resilient, form-sustaining, longitudinally split cylindrical pad similar to that illustrated in FIGURES 2 and 3.

Figure 7:
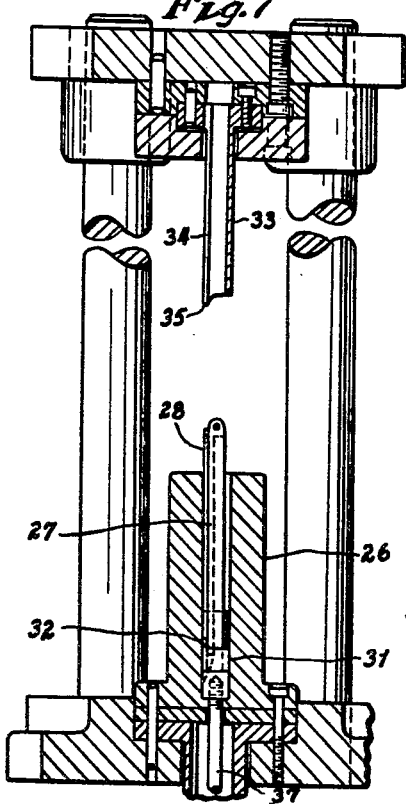
FIGURE 7 is a vertical section through the press mechanism which is used to compress a folded fabric body into a self-sustaining, longitudinally split cylindrical pad.
Figure 8:
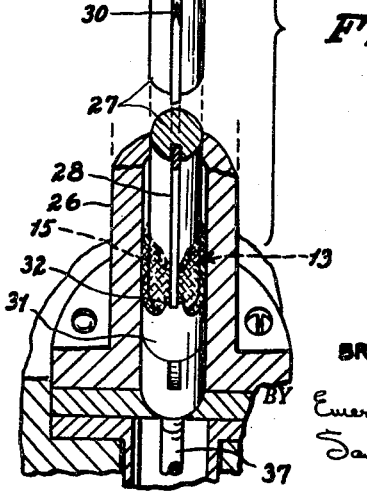
FIGURE 8 is a fragmentary perspective view, with parts broken away, enlarged as compared to FIGURE 7, of the dies utilized for forming the longitudinally split cylindrical pad.

FIGURE 7 shows a press for consolidating the folded multi-layer wire fabric units produced by the folding operation illustrated in FIGURES 5 and 6. FIGURE 8 discloses the dies and punch of the press to somewhat larger scale. Secured on the platen of the press is the tubular outer die 26. Mounted within the die 26 is the inner die comprising the axially disposed post 27 and the blade 28. The blade 28 has generally an inverted L-shape, the vertical leg being relatively long. The transverse upper end of the blade is secured, for example by a pin 29, in a slot extending across the top of the post 27, and the blade extends vertically of the post in a continuation of this slot cut in one side of the post.

The post 27 is smaller than the bore of the outer die 26 to leave a space equal to the desired thickness of the pad. Except at the rounded top of the post, the blade 28 projects radially beyond the surface of the post and spans the space to the inner wall of the outer die 26. The blade separates the edges of the longitudinally split cylindrical pad during the consolidating operation and prevents their entanglement. The upper end of the blade, where it projects beyond the surface of the post, may be sharpened as shown at 30 to facilitate separating the edges of the rolled metal fabric unit as it is inserted between the upper ends of the two dies.

Telescoped between the outer die 26 and the post 27, and normally located near the bottom of the outer die, is a sleeve 31 which completely encircles the post. Projecting upwardly from the top edge of this sleeve, with sloping surfaces, is a truncated ear 32, the top of which is slotted to form a seat to receive the bottom edge of the blade 28. This truncated ear 32, in cooperation with the blade 28, serves in forming the tabs and the tapering surfaces which extend from the tabs to the bottom end of the pad.

The ram of the press, movable relative to the platen on suitable guide posts, has secured thereon the punch 33, which is axially aligned with the outer and inner dies on the platen. The punch 3 is tubular, the lower end thereof being of a thickness to enter between the outer die and the post of the inner die with a sliding fit. This tubular punch is slotted longitudinally, as shown at 34, the purpose of this slot being to receive the vertical leg of the blade 28 when the punch is pressed home into the space between the inner and outer dies. When this occurs, a metal fabric pad which has been inserted between the dies will be compressed and consolidated along in the direction of the longitudinal axis of the dies.

The lower end of the punch 33 is provided, on opposite sides of the slot 34, with similar ears 35 which match the ear 32 and cooperate therewith in forming the tabs 14 and the tapering edges 15 from the tabs to the ends of the cylindrical pad. The wall of the punch may be undercut as shown at 36, either on the inside, the outside, or both, to provide operating clearance.

The method of producing a clamp pad will next be described. A metal fabric unit produced in accordance with the method illustrated either in FIGURE 5 or FIGURE 6 is rolled into a longitudinally split cylindrical shape and inserted between the inner and outer dies, the longitudinal edges of the cylindrical form being separated by the vertical leg of the blade 28. This metal fabric unit is pushed down between the dies and the ram of the press then is lowered to cause the punch 33 to consolidate the unit in the direction of its longitudinal axis. Radial expansion of the unit during such consolidation is limited by the inner and outer dies.

As the punch is lowered into the space between the dies, the rows of loops in the fabric body slide and telescope on each other if the direction of compression is in the direction of the original longitudinal axis of the knitted tube. If the compression is transverse to the original longitudinal axis of the knitted tube, the loops within a row will tend to fold and telescope on each other. The punch also produces some deformation of the original loops where they overlie and cross each other and this results in an interlocking of contiguous layers causing them to be firmly and resiliently interentangled. The degree of consolidation to be performed will depend on the desired resiliency of the finished pad. The ears 32 and 33 serve to chamfer the corners of the longitudinally split pad, forming the tabs 14 and the tapered edges 15 extending from the tabs to the ends of the cylinder.

Upon completion of the compressing and consolidating step, the ram of the press will be raised to withdraw the punch from between the dies. The ejector rod 37, to the upper end of which the inner die is secured, then will be raised until the consolidated pad is exposed above the top of the outer die. The pad then will be stripped from the inner die and the ejector rod will be lowered to restore the apparatus to condition for receiving another knitted fabric unit.

Where the expression "tube clamp" is used herein it is not a term of limitation, but is intended to apply broadly to clamps and clips, or the like, designed and intended for gripping and holding fuel lines, oil lines, electrical conduits, and other elongated cylindrical objects.

It will be understood that the invention herein disclosed may be variously modified and embodied within the scope of the subjoined claims.

I claim:

1. The method of manufacturing a resilient, form-retaining wire mesh body adapted to serve as a liner for a tube clamp, said method comprising the steps of knitting a tube of wire, pressing the knitted tube flat, severing a length of the flattened tube, folding the severed length of knitted tube into a flat multi-layer unit with the severed ends located inside the unit, rolling the flat multi-layer unit into a longitudinaly split cylindrical shape, consolidating the longitudinally split cylindrically shaped unit by pressing it in the direction of the longitudinal axis of the cylinder, while limiting radial expansion of the unit, first to cause the loops of the knitted structure to slide on each other, and then under sufficient pressure to cause contiguous layers to become firmly and resiliently interentangled in longitudinally split cylindrical form and, while so consolidating the longitudinally split cylindrically shaped unit longitudinally, simultaneously consolidating the corners of the longitudinal split in a circumferential direction to chamfer the said corners.

2. The method of manufacturing a resilient, form-retaining wire mesh body adapted to serve as a liner for a tube clamp, said method comprising the steps of knitting a tube of wire, pressing the knitted tube flat, severing a length of the flattened tube, folding the severed length of knitted tube into a flat multi-layer unit with the severed ends located inside the unit, rolling the flat multi-layer unit into a longitudinally split cylindrical shape, consolidating the longitudinally split cylindrically shaped unit by pressing it in the direction of the longitudinal axis of the cylinder, while limiting radial expansion of the unit, first to cause the loops of the knitted structure to slide on each other, and then under sufficient pressure to cause contiguous layers to become firmly and resiliently interentangled in longitudinally split cylindrical form and, while so consolidating the longitudinally split cylindrically shaped unit longitudinally, simultaneously consolidating the corners of the longitudinal split in a circumferential direction to form tabs intermediate the ends of the cylinder and tapering surfaces from the tabs to the ends of the cylinder.

References Cited in the file of this patent

UNITED STATES PATENTS

| | | |
|---|---|---|
| 2,439,424 | Goodloe | Apr. 13, 1948 |
| 2,724,176 | White | Nov. 22, 1955 |
| 2,755,079 | York | July 17, 1956 |
| 2,857,610 | Rympalski | Oct. 28, 1958 |